(12) United States Patent
Rothenberg

(10) Patent No.: US 10,618,374 B2
(45) Date of Patent: Apr. 14, 2020

(54) HVAC DEFROST OUTLET AIRFLOW CONTROL

(71) Applicant: Denso International America, Inc., Southfield, MI (US)

(72) Inventor: Mark Rothenberg, Farmington Hills, MI (US)

(73) Assignee: DENSO International America, Inc., Southfield, MI (US)

(*) Notice: Subject to any disclaimer, the term of this patent is extended or adjusted under 35 U.S.C. 154(b) by 411 days.

(21) Appl. No.: 15/674,157

(22) Filed: Aug. 10, 2017

(65) Prior Publication Data

US 2019/0047355 A1 Feb. 14, 2019

(51) Int. Cl.
*B60S 1/54* (2006.01)
*B60H 1/00* (2006.01)

(52) U.S. Cl.
CPC ............... *B60H 1/00678* (2013.01); *B60H 2001/00707* (2013.01); *B60H 2001/00721* (2013.01)

(58) Field of Classification Search
CPC ............ B60H 1/00842; B60H 1/00064; B60H 1/00678
USPC .......................... 454/121–127; 165/204, 231
See application file for complete search history.

(56) References Cited

U.S. PATENT DOCUMENTS

| | | | |
|---|---|---|---|
| 8,936,069 B2* | 1/2015 | Chikagawa | B60H 1/00028 165/42 |
| 2010/0248608 A1 | 9/2010 | Belanger | |
| 2013/0045670 A1* | 2/2013 | Han | B60H 1/00692 454/127 |

* cited by examiner

*Primary Examiner* — Vivek K Shirsat
(74) *Attorney, Agent, or Firm* — Harness, Dickey & Pierce, P.L.C.

(57) ABSTRACT

A defrost airflow door assembly for a vehicle heating, ventilation, and air conditioning (HVAC) assembly. The defrost airflow door assembly includes a main defrost door defining a defrost bleed opening. The main defrost door is movable to control airflow through a windscreen defrost outlet of the HVAC assembly. A side defrost door is movable to control airflow through both the defrost bleed opening and a side window defrost outlet of the HVAC assembly.

18 Claims, 4 Drawing Sheets

HVAC DEFROST OUTLET AIRFLOW CONTROL

FIELD

The present disclosure relates to control of airflow through defrost outlets of a heating, ventilation, and air conditioning (HVAC) system.

BACKGROUND

This section provides background information related to the present disclosure, which is not necessarily prior art.

Heating, ventilation, and air conditioning (HVAC) systems for vehicles often use a side face bleed to control window fogging in a foot mode. Recently there has been a trend towards requiring a similar bleed, but from the side-window defrost outlets. Existing HVAC system architectures are designed to support the face bleed (using air paths built into the cases), so architecture changes are required to support the trend toward side-window defrost outlet airflow bleeds in a foot mode. For example, some systems use a large sub-defrost door to block the main defrost outlet, but this is a costly and complex solution that requires additional parts and design resources to implement. Furthermore, such doors are prone to noise issues (e.g., whistles due to small openings), vibration issues due to shaft strength, and make it difficult to get precise main defrost bleed values. The sub-defrost door also blocks airflow even in the open position, and hence impacts overall performance.

The present teachings advantageously provide for an improved HVAC system that addresses the issues with current systems. For example, the HVAC system according to the present teachings advantageously eliminates the small door openings currently used to provide defrost bleed conditions, which are difficult for kinematic systems to control. The present teachings also allow for simplified HVAC case structures, and the airflow doors according to the present teachings can fit in an area that is sized similar to existing defrost door designs. The present teachings provide for numerous additional advantages as explained herein, and as one skilled in the art will recognize.

SUMMARY

This section provides a general summary of the disclosure, and is not a comprehensive disclosure of its full scope or all of its features.

The present teachings include a defrost airflow door assembly for a vehicle heating, ventilation, and air conditioning (HVAC) assembly. The defrost airflow door assembly includes a main defrost door defining a defrost bleed opening. The main defrost door is movable to control airflow through a windscreen defrost outlet of the HVAC assembly. A side defrost door is movable to control airflow through both the defrost bleed opening and a side window defrost outlet of the HVAC assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
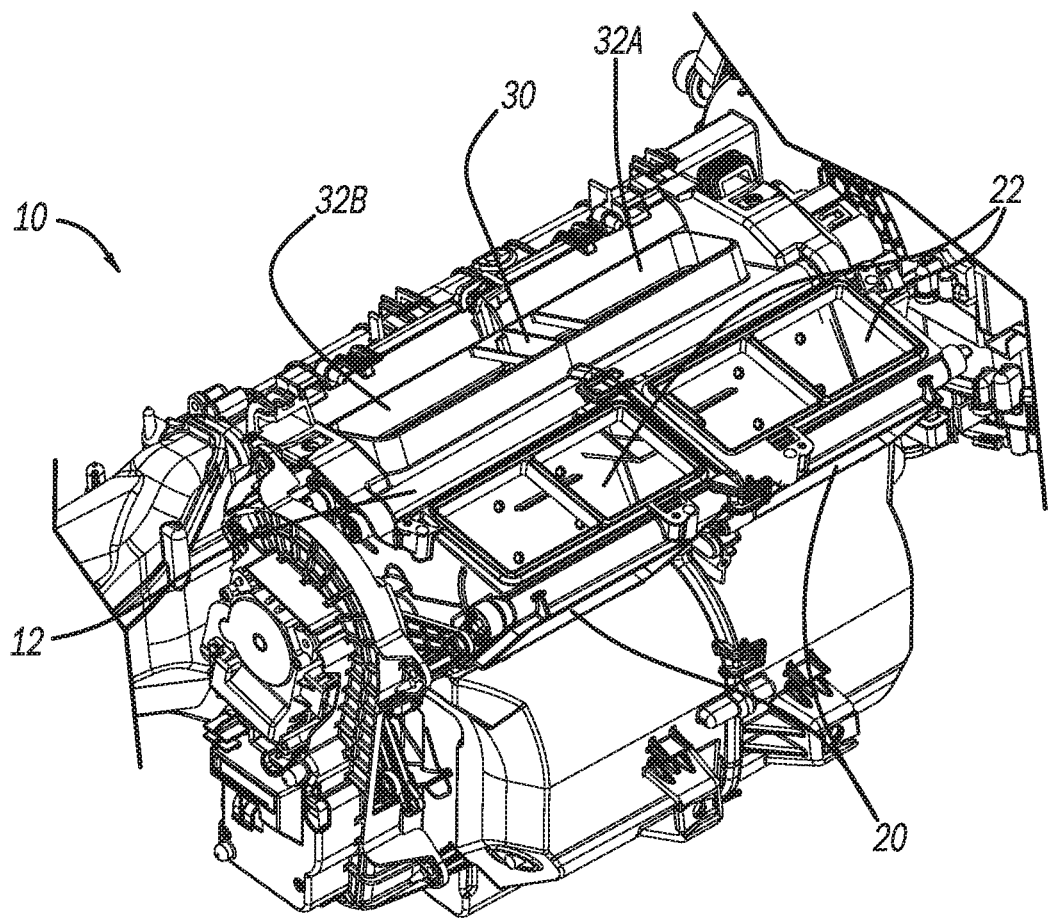
FIG. 1 is a perspective view of a heating, ventilation, and air conditioning (HVAC) assembly in accordance with the present teachings.

FIG. 1 illustrates a heating, ventilation, and air conditioning (HVAC) assembly 10 in accordance with the present teachings. Although the HVAC assembly 10 is illustrated as a vehicle HVAC assembly, the HVAC assembly 10 can be used for any suitable purpose in any suitable application. The HVAC assembly 10 can be used with any suitable vehicle, such as any suitable passenger vehicle, mass transit vehicle, recreational vehicle, military vehicle, construction equipment, watercraft, aircraft, etc. The HVAC assembly 10 may be used with any suitable non-vehicular application as well.

The HVAC assembly 10 includes an HVAC case 12, which defines a plurality of airflow outlets. For example, the HVAC case 12 defines foot airflow outlets 20, face outlets 22, center or windscreen defrost outlet 30, first side window defrost outlet 32A, and second side window defrost outlet 32B. The foot airflow outlets 20 are arranged to direct airflow towards a floor of a passenger cabin, and thus towards the feet of those seated in the passenger cabin. The face outlets 22 are arranged to direct airflow towards the faces or upper bodies of those seated in the passenger cabin. The center or windscreen defrost outlet 30 is arranged to direct defrost airflow towards a windscreen of the vehicle. The first side window defrost outlet 32A is configured to direct defrost airflow towards a first side window of a vehicle, such as a passenger side window of a vehicle. The second side window defrost outlet 32B is configured to direct defrost airflow towards a second side window of a vehicle, such as a driver's side window.

Figure 2:
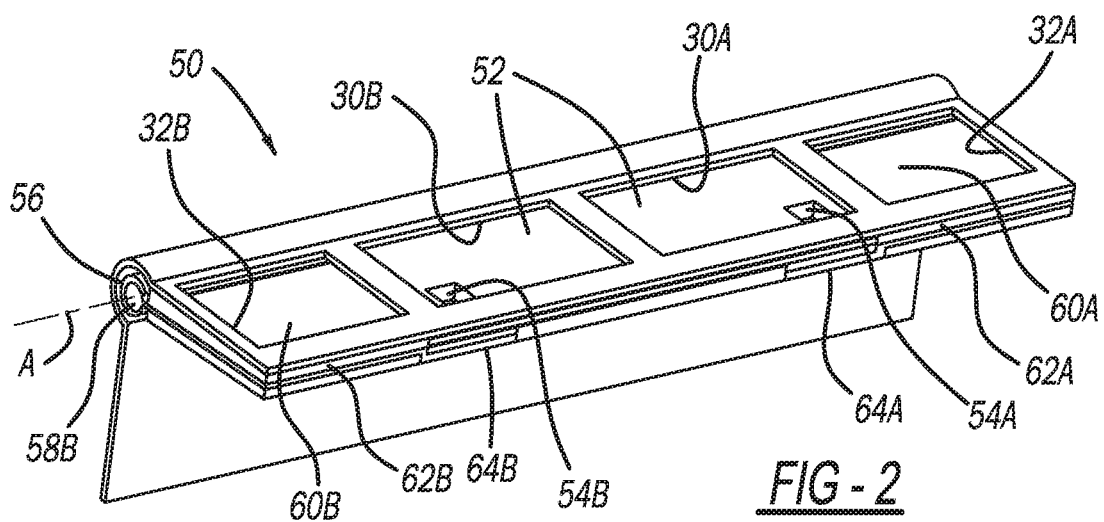
FIG. 2 is a perspective view of a defrost airflow door assembly in accordance with the present teachings for inclusion with the HVAC assembly of FIG. 1, the defrost airflow door assembly includes airflow doors that are illustrated in a closed position.

With additional reference to FIG. 2, a defrost airflow door assembly in accordance with the present teachings is illustrated at reference numeral 50. The defrost airflow door assembly 50 controls airflow through the windscreen defrost outlet 30 (both a first potion 30A and a second portion 30B of the outlet 30), and the first and second side window defrost outlets 32A and 32B as explained herein. The defrost airflow door assembly 50 generally includes a main or center defrost door 52, a first side defrost door 60A, and a second side defrost door 60B.

The main or center defrost door 52 is rotatable about longitudinal axis A to control airflow through the first portion 30A and the second portion 30B of the windscreen defrost outlet 30. The center defrost door 52 defines a first defrost bleed opening 54A and a second defrost bleed opening 54B, each of which are completely surrounded by the center defrost door 52. The first defrost bleed opening 54A is at the first portion 30A of the windscreen defrost outlet 30, and the second defrost bleed opening 54B is at the second portion 30B of the windscreen defrost outlet 30.

The door assembly 50 further includes a first side defrost door 60A and a second side defrost door 60B, each of which are rotatable about the longitudinal axis A to control airflow through the first side window defrost outlet 32A and the second side window defrost outlet 32B respectively. The first side defrost door 60A includes a first (outer or upper) surface 62A, and a second (inner or lower) surface 64A. Similarly, the second side defrost door 60B includes a first (outer or upper) surface 62B and a second (inner or lower) surface 64B. The first surfaces 62A and 62B are at the first and second side window defrost outlets 32A and 32B respectively to control airflow therethrough. The second surfaces 64A and 64B are opposite to, and overlap when closed, the center defrost door 52. Specifically, the second surface 64A overlaps the first defrost bleed opening 54A, and the second surface 64B overlaps the second defrost bleed opening 54B.

Figure 3:
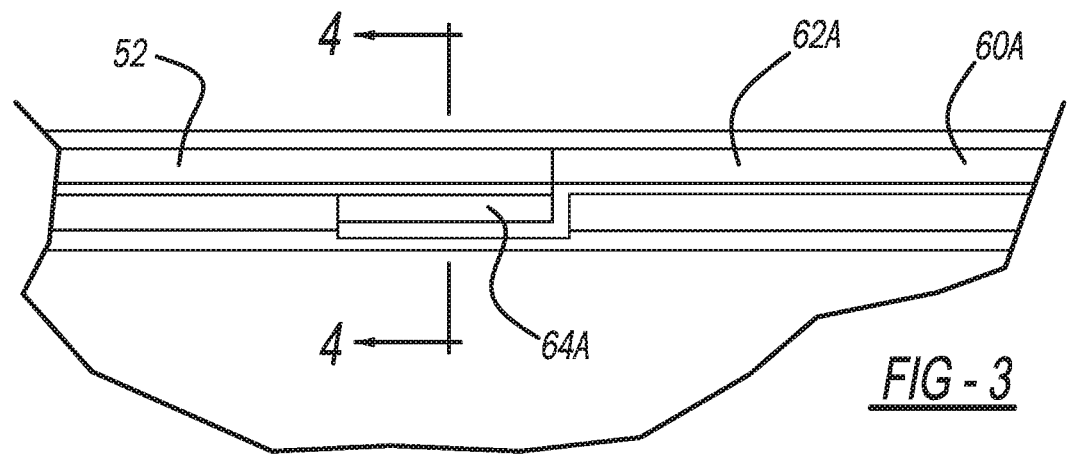
FIG. 3 is a side view illustrating cooperation between a center defrost door and a side window defrost door of the defrost airflow door assembly of FIG. 2.
Figure 4:
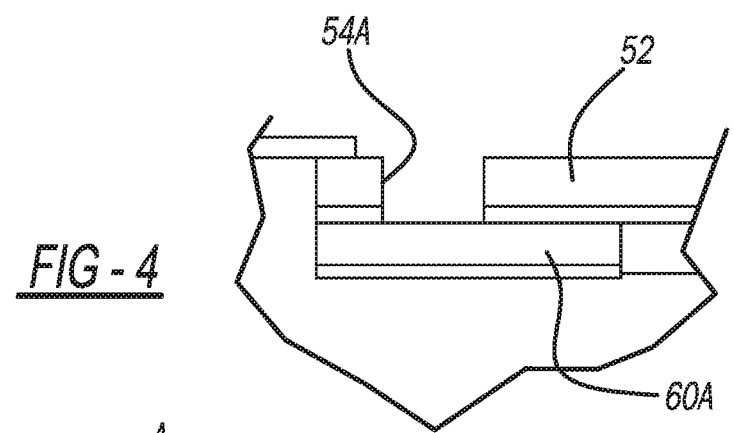
FIG. 4 is a cross-sectional view taken along line 4-4 of FIG. 3.

In the closed or off position of the defrost airflow door assembly 50 illustrated in FIG. 2, the center defrost door 52 is closed against the first and second portions 30A and 30B of the windscreen defrost outlet 30 in order to restrict airflow therethrough. Also, the first and second side defrost doors 60A and 60B are closed against the first and second side window defrost outlets 32A and 32B respectively to restrict airflow therethrough. Specifically, the first surfaces 62A and 62B are arranged against the first and second side window defrost outlets 32A and 32B. The second surfaces 64A and 64B abut the center defrost door 52. Specifically, the second surfaces 64A and 64B seal against the center defrost door 52 across the portions thereof defining the first and second defrost bleed openings 54A and 54B to restrict airflow through the first and second defrost bleed openings 54A and 54B. FIGS. 3 and 4 are additional drawings illustrating cooperation between the first side door 60A (and specifically the second surface 64A thereof) and the center defrost door 52.

Figure 5:
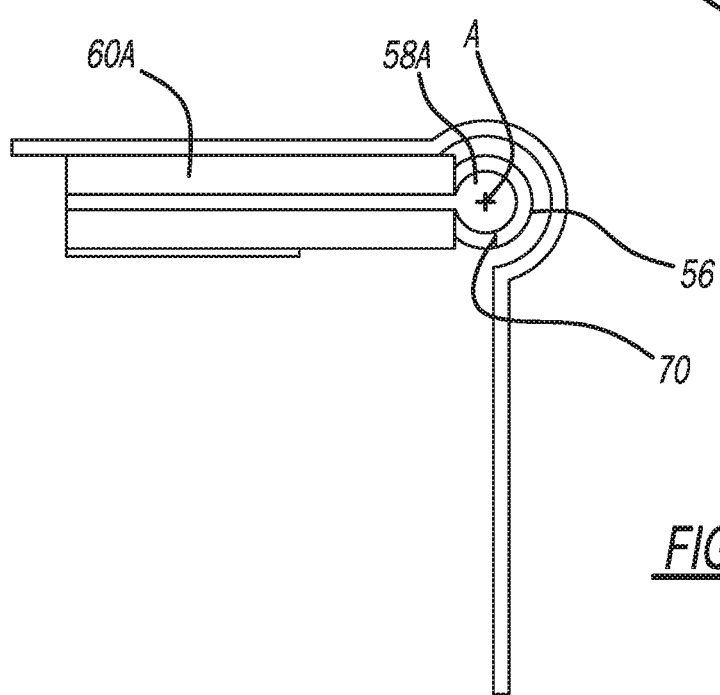
FIG. 5 is an end view of the defrost airflow door assembly as illustrated in FIG. 2.

With reference to FIG. 5, the center defrost door 52 includes an outer shaft 56 and the first side defrost door 60A includes an inner shaft 58A. Similarly, the second side defrost door 60B includes an inner shaft 58B (see FIG. 2 for example). Both inner shafts 58A and 58B are seated within the outer shaft 56. The longitudinal axis A extends through an axial center of the outer shaft 56, as well as both inner shafts 58A and 58B. The outer shaft 56 defines a gap 70, which provides a clearance for the inner shafts 58A and 58B to rotate within the outer shaft 56. Configuring the airflow door assembly 50 such that the center defrost door 52, the first side defrost door 60A, and the second side defrost door 60B rotate about a common axis, longitudinal axis A, advantageously reduces the space within the HVAC case 12 needed to accommodate the airflow door assembly 50, and allows the airflow door assembly 50 to fit within existing HVAC cases.

Figure 6:
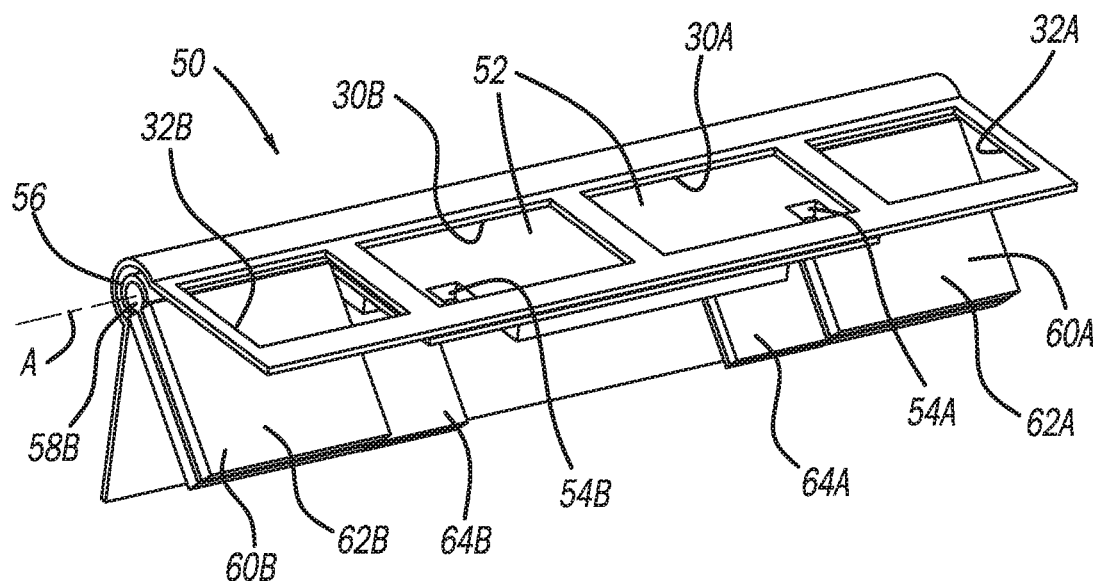
FIG. 6 is a perspective view of the defrost airflow door assembly of FIG. 2 with both side window defrost doors illustrated in an open position, and with the center defrost door illustrated in the closed position.
Figure 7:
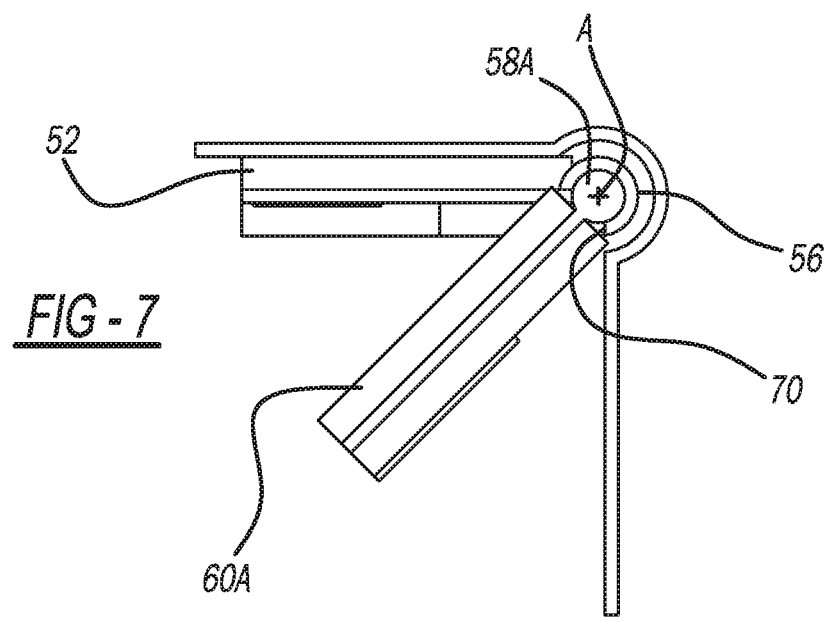
FIG. 7 is an end view of the defrost airflow door assembly as illustrated in FIG. 6.

FIGS. 6 and 7 illustrate the defrost airflow door assembly 50 as it would be configured when the HVAC assembly 10 is in a foot mode in which foot airflow outlets 20 are opened in order to direct warm air towards the feet of those within the vehicle. In the foot mode of the HVAC assembly 10, the first and second side defrost doors 60A and 60B are rotated to the open position illustrated in order to allow airflow to flow out through the first and second side window defrost outlets 32A and 32B. Furthermore, because the second surfaces 64A and 64B of the first and second side defrost doors 60A and 60B respectively are rotated away from the center defrost door 52, the first and second defrost bleed openings 54A and 54B are no longer sealed closed. Thus defrost airflow will flow through the first and second defrost bleed openings 54A and 54B to provide a main defrost bleed.

Figure 8:
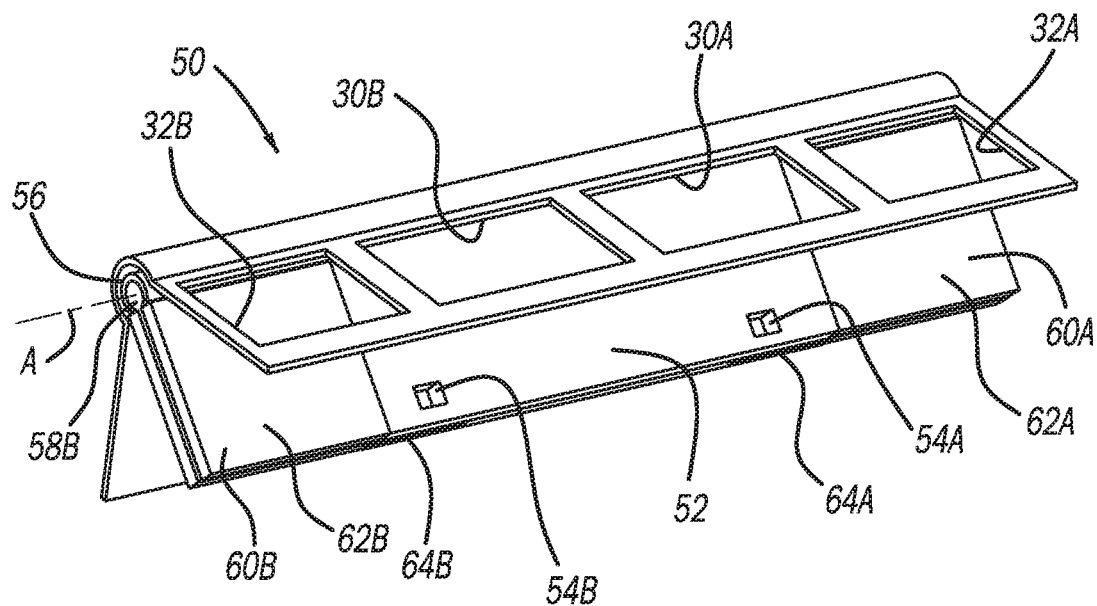
FIG. 8 is a perspective view of the defrost airflow door assembly of FIG. 2 with both side window defrost doors and the center defrost door illustrated in the open position.
Figure 9:
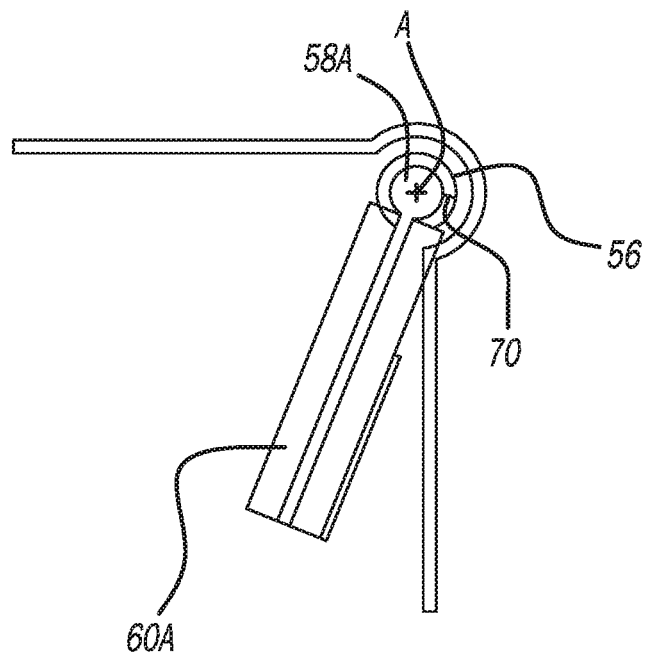
FIG. 9 is an end view of the defrost airflow door assembly as illustrated in FIG. 8.

FIGS. 8 and 9 illustrate the defrost airflow door assembly 50 as it would be configured when the HVAC assembly 10 is in a foot/full defrost mode. In this configuration, each one of the center defrost door 52, the first side defrost door 60A, and the second side defrost door 60B are open to allow warm defrost airflow to flow through each one of the windscreen defrost outlet 30, the first side window defrost outlet 32A, and the second side window defrost outlet 32B.

The present teachings thus provide numerous advantages. For example, the defrost airflow door assembly 50 allows the HVAC case 12 to be simplified, because the defrost airflow door assembly 50 can be packaged within an area similar in size to existing defrost door designs. Furthermore, the defrost airflow door assembly eliminates the small door openings currently used to provide defrost bleed conditions, which are difficult for kinematic systems to control. The door assembly 50 advantageously permits the first and second side defrost doors 60A and 60B to seal against the center defrost door 52, and seal the first and second defrost bleed openings 54A and 54B, which allows for cold modes (face and bi-level) to seal properly, and full airflow can be delivered to the side-windows for defrosting purposes with the airflow to the side windows being independent of the windscreen defrost outlet 30. When open, both the first and second side defrost doors 60A and 60B are clear of the airflow path, which will provide for improved performance by decreasing system pressure drop.

The two-door concentric design of the defrost airflow door assembly 50 advantageously allows for a main-defrost and side-window defrost system that can provide fully open airflow to the side windows, fulfilling the trend towards side window defrost clearing, and the trend away from side face bleed. The first and second defrost bleed openings 54A and 54B allow for tuned airflow delivery to the windscreen defrost outlet 30 in foot mode, eliminating the previous need for small door openings, which have proven temperamental for control levers. When the center defrost door 52 and the first and second side defrost doors 60A and 60B are fully open, they are clear of the airflow path, thereby allowing airflow to exit the HVAC case 12 through the door assembly 50 generally unobstructed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A defrost airflow door assembly for a vehicle heating, ventilation, and air conditioning (HVAC) assembly, the defrost airflow door assembly comprising:
   a main defrost door defining a first defrost bleed opening, the main defrost door movable to control airflow through a windscreen defrost outlet of the HVAC assembly; and
   a first side defrost door movable to open and close both the first defrost bleed opening and a first side window defrost outlet of the HVAC assembly.

2. The defrost airflow door assembly of claim 1, wherein the first defrost bleed opening is entirely surrounded by the main defrost door.

3. The defrost airflow door assembly of claim 1, wherein a portion of the first side defrost door is opposite to the first defrost bleed opening.

4. The defrost airflow door assembly of claim 1, wherein when both the main defrost door and the first side defrost door are closed, the first side defrost door abuts against the main defrost door to close the first defrost bleed opening.

5. The defrost airflow door assembly of claim 1, wherein the main defrost door and the first side defrost door rotate about a common axis.

6. The defrost airflow door assembly of claim 5, wherein an inner shaft of the first side defrost door rotates within an outer shaft of the main defrost door.

7. The defrost airflow door assembly of claim 6, wherein the outer shaft defines a gap within which the first side defrost door can rotate.

8. The defrost airflow door assembly of claim 1, further comprising:
   a second defrost bleed opening defined by the main defrost door; and
   a second side defrost door movable to control airflow through both the second defrost bleed opening and a second side window defrost outlet;
   wherein the main defrost door is between the first side defrost door and the second side defrost door.

9. The defrost airflow door assembly of claim 8, wherein the main defrost door, the first side defrost door, and the second side defrost door all rotate about a common axis.

10. The defrost airflow door assembly of claim 9, wherein both the first side defrost door and the second side defrost door are received within, and rotate within, an outer shaft of the main defrost door.

11. A defrost airflow door assembly for a vehicle heating, ventilation, and air conditioning (HVAC) assembly, the defrost airflow door assembly comprising:
   a main defrost door defining a first defrost bleed opening, the main defrost door movable to control airflow through a windscreen defrost outlet of the HVAC assembly; and
   a first side defrost door including a first portion at a first side window defrost outlet of the HVAC assembly, and a second portion that is opposite to the first defrost bleed opening, the first side defrost door is movable to open and close both the first defrost bleed opening and the first side window defrost outlet.

12. The defrost airflow assembly of claim 11, wherein the main defrost door and the first side defrost door rotate about a common axis.

13. The defrost airflow assembly of claim 11, wherein an inner shaft of the first side defrost door is received within, and rotates within, an outer shaft of the main defrost door.

14. The defrost airflow assembly of claim 13, wherein the outer shaft defines a gap that the first side defrost door rotates within.

15. The defrost airflow assembly of claim 11, wherein in a closed position the first side defrost door seals against the main defrost door to restrict airflow through the first defrost bleed opening.

16. The defrost airflow assembly of claim 11, further comprising:
- a second defrost bleed opening defined by the main defrost door; and
- a second side defrost door movable to control airflow through both the second defrost bleed opening and a second side window defrost outlet;
- wherein the main defrost door is between the first side defrost door and the second side defrost door.

17. The defrost airflow door assembly of claim 16, wherein the main defrost door, the first side defrost door, and the second side defrost door all rotate about a common axis.

18. The defrost airflow door assembly of claim 17, wherein both the first side defrost door and the second side defrost door are received within, and rotate within, an outer shaft of the main defrost door.

* * * * *